Jan. 16, 1934.  A. F. LUKENS  1,944,090
ALTERNATING CURRENT MOTOR CONTROL
Filed Nov. 30, 1932
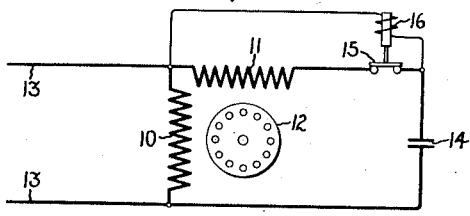
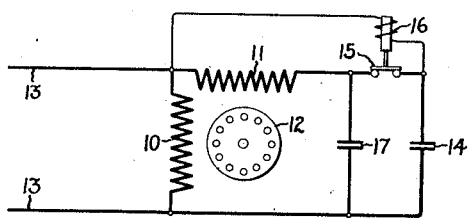
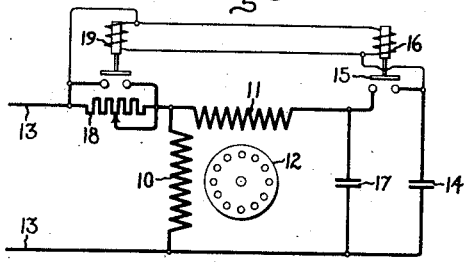
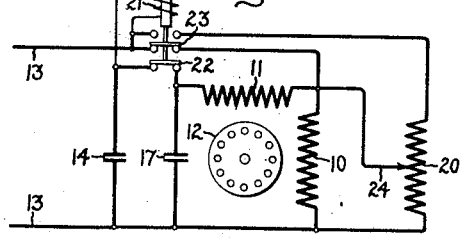
Inventor:
Alan F. Lukens,
by Charles Mueller
His Attorney.

Patented Jan. 16, 1934

1,944,090

UNITED STATES PATENT OFFICE 1,944,090

ALTERNATING CURRENT MOTOR CONTROL

Alan F. Lukens, Pittsfield, Mass., assignor to General Electric Company, a corporation of New York Application November 30, 1932
Serial No. 644,994

11 Claims. (Cl. 172—279)

My invention relates to control means for electric motors, particularly single phase split phase alternating current motors.

In motors employing condensers or other split phase starting devices, it is advisable to cut the device out of circuit for running, or, if a capacitance, to modify its effect between starting and running conditions.

It has heretofore been proposed to use a relay responsive to the increase in voltage across the starting winding between starting and running conditions to thus control the starting winding circuit. One difficulty with the use of such a voltage relay as heretofore employed is that the relay has been continuously subjected to the high voltage across the starting winding during normal running. This makes the relay somewhat expensive, and, moreover, unnecessarily wasteful of electric current. The main object of my invention is to overcome this difficulty by an arrangement where such relays are subjected to a reduced holding voltage after the motor has been started and the relay has performed its function.

The features of my invention which are believed to be novel and patentable will be pointed out in the claims appended hereto.

For a better understanding of my invention, reference is made in the following description to the accompanying drawing, showing in Fig. 1 my invention as applied to simply opening the starting winding circuit after the motor has been started; Fig. 2 shows the invention as applied to changing the value of a capacitance between starting and running conditions; Fig. 3 shows the arrangement of Fig. 2 with the addition of a second voltage relay which is employed to open a circuit across a speed adjusting impedance device; and Fig. 4 shows a modified adjustable speed capacitor motor where a single relay performs the functions of the two relays of Fig. 3.

Referring to Fig. 1, I have here represented a single phase motor having main and starting primary windings 10 and 11 displaced at an angle to each other, with a squirrel cage type or other short circuited type of secondary rotor represented at 12. The line or energizing terminals of the motor are represented at 13. A phase modifying device 14 is included in the starting winding circuit to obtain split phase starting when the switch shown at 15 is closed as shown. The main and starting winding circuits are connected in parallel. Switch 15 is automatically opened after the motor is started by a relay 16 connected to be responsive to the voltage across the starting winding 11.

It is well known that in this form of motor the voltage across the starting winding increases as the motor comes up to speed and is roughly proportional to the speed such that when the motor comes up to full speed the voltage across the starting winding is considerably higher than line voltage in the usual motor of this type.

It will be noted that the relay 16 is connected across the starting winding 11 and switch 15. As a consequence, switch 15 will open as the motor approaches full running speed. After the switch 15 is opened, the voltage across relay coil 16 is advantageously reduced to a value only sufficient to hold the switch open. Prior hereto this has not been done and the relay has had to be designed to withstand the high voltage across the starting winding and has consumed an unnecessary amount of energy throughout the running period of the motor.

According to my invention, the relay is connected across the starting winding on the condenser side of switch 15 so that when this switch is opened the voltage across the relay coil drops to approximately line voltage, since with switch 15 open there is practically no voltage across the condenser.

In Fig. 2, an additional condenser 17 is provided, which is used in series with the starting winding during normal operation for power factor correction, and to increase the available running torque. The remaining parts are the same as in Fig. 1. In Fig. 2, the motor is started with condensers 14 and 17 in parallel and in series with the starting winding, the starting winding circuit thus formed being connected in parallel with main winding 10 across line 13. As the motor comes up to speed, relay 16 opens switch 15, disconnecting condenser 14 from the starting winding, reducing the voltage applied to the relay winding, as in Fig. 1, but leaving the starting winding in circuit with a reduced value of capacitance 17.

In Fig. 3, I have added to the arrangement of Fig. 2 a variable impedance 18, by means of which the voltage and speed of the motor may be varied during normal operation, and a second voltage relay 19 having its coil connected in parallel with relay coil 16 to short-circuit impedance 18 during the starting period. With this arrangement at start, relays 16 and 19 will be in positions to close the switch contacts which they control. The motor will start with full line voltage applied, as in Fig. 2, and come up to speed. Then the voltage across the relay windings, which is the same as that across starting winding 11 with the relay controlled switches closed, will cause these switches to open. This reduces the capacitance in the starting winding circuit by cutting out condenser 14. It reduces the voltage across both relay windings to practically line voltage, and the motor will then run at a speed determined by the setting of the variable impedance 18. It is seen that variation in speed by adjustment of impedance 18 does not affect the holding voltage for relays 16 and 19, so that the speed may be varied between wide limits without causing the relays to drop out. The relays are here shown in their running positions.

Fig. 4 shows another variable speed capacitor motor, speed variation being obtained by an adjustable auto-transformer 20. The single relay 21 serves the purpose of both relays 16 and 19 of Fig. 3. The relay is shown in the starting position, where it will be seen that the relay coil is connected across the starting winding 11 through switch bars 22 and 23. Condensers 14 and 17 are connected in parallel in the starting winding circuit through switch bar 22 and the motor is connected directly to line 13 from the common point of the motor windings through switch bar 23 and the permanent connections on the other side. At this time it is evident that transformer 20 has no influence upon motor starting, since its upper terminal is disconnected. The motor thus starts with high torque and full voltage. The voltage across the starting winding increases, and at the desired speed the relay 21 operates and pulls up its armature with the switch bars 22 and 23. The capacitance is reduced, since now condenser 14 is cut out due to the opening of its circuit at 22. Relay 21 is now connected across the line through the idle condenser 14, and the relay voltage, therefore, drops to a desirable holding value. Switch bar 23 opens the direct line connection to the motor and closes it through the upper contacts, auto-transformer 20, and the adjustable lead 24. The motor may now have its speed varied by variation of the motor voltage with the adjustable auto-transformer without changing the holding voltage of relay 21.

It will also be noted that while the motor is momentarily deenergized when the relay operates, the circuit to the relay coil is never deenergized. Thus, while the voltage across the starting winding may drop very materially as the relay operates and momentarily opens the motor circuit at switch bar 23, the relay is continuously energized and its voltage merely drops to substantially line voltage. In all modifications the relays immediately drop out in case of line voltage failure.

Several different applications of the invention have been illustrated, and others will occur to those skilled in the art. The details of the phase modifying means between starting and running conditions may be modified as conditions warrant. It will also be evident that the invention is not confined to the use of capacitance as a phase splitter. I therefore do not wish to confine my invention to the exact details and arrangements given herein by way of illustration, but seek claims commensurate with the true spirit and scope of my invention.

What I claim as new and desire to secure by Letters Patent of the United States is:

1. An alternating current motor having a primary winding across which the voltage increases as the motor comes up to speed, circuit controlling means associated with said winding for changing the motor connections between starting and running conditions, a relay connected to be responsive to the voltage across said winding only during the starting connection of the motor for operating said circuit controlling means, the operation of the circuit controlling means serving to reduce the voltage on said relay to a holding value below that necessary for its operation.

2. An alternating current motor having a primary winding across which the voltage increases as the motor comes up to speed, phase modifying means connected to one end of said winding, a switch for disconnecting the phase modifying means from said winding, and a relay connected between the other end of said winding and the phase modifying side of said switch for operating said switch as the motor comes up to speed.

3. A single phase motor having main and starting windings displaced at an angle to each other, a phase modifying device connected in series relation with the starting winding, the starting winding circuit thus formed being connected in parallel with the main winding to energizing terminals, a switch for opening a circuit between the phase modifying device and starting winding as the motor comes up to speed, and a relay connected between the common connection of said windings during the starting connection and a point between said switch and phase modifying device for operating said switch.

4. A single phase motor having main and starting windings displaced at an angle to each other, a phase modifying device connected in series relation with said starting winding, and the circuit thus formed connected in parallel with the main winding to energizing terminals, a switch between the starting winding and said phase modifying device for disconnecting the latter after the motor is started, a second phase modifying device connected in parallel with the first phase modifying device when said switch is closed, and in series with the starting winding when said switch is open, a relay for operating said switch having a winding connected between the common energizing terminal to the motor windings during the starting connection of the motor and a point between said switch and first mentioned phase modifying device so as to be subject to the voltage across the starting winding only when said switch is closed and thereafter to be subject to a substantially constant holding voltage of lower value than that required for its operation.

5. An alternating current motor having a primary winding across which there is an increase in voltage between starting and running conditions, phase modifying means connected in series relation with said winding, switch means for disconnecting said phase modifying means from said winding after the motor has been started, voltage varying means for varying the speed of said motor, switch means for inserting said voltage varying means in the motor circuit after the motor has been started, and relay means responsive to the voltage across said winding when the motor is being started and responsive to substantially the line voltage of said motor after the motor has been started for operating said two mentioned switching means.

6. An alternating current motor having a winding across which there is an increase in voltage between starting and running conditions, voltage varying means for varying the speed of said motor, switch means for inserting said voltage varying means in the motor circuit after the motor has been started, and relay means responsive to the voltage across said winding while the motor is being started and responsive to substantially the line voltage of said motor after the motor has been started for operating said switching means.

7. An alternating current motor having a winding across which there is a voltage which varies in proportion to the speed of the motor, voltage varying means for said motor for varying its speed, switching means for disconnecting said motor from direct connection with a line terminal and reconnecting it again with the voltage varying means in its circuit, and a continuously energized relay means responsive to the voltage across said winding while the motor is being started and responsive to substantially the line voltage of said motor after the motor has been started for operating said switching means.

8. A single phase motor having main and starting windings connected in parallel circuits to energizing terminals, a phase modifying device in the starting winding circuit, switching means for modifying the condition of said starting winding circuit between starting and running conditions, and constantly energized relay means responsive to the voltage across the starting winding while the motor is being started and responsive to substantially the line voltage of said motor after it has been started for operating said switching means.

9. A single phase motor comprising main and starting windings connected in parallel circuits to energizing terminals, a condenser in series relation in the starting winding circuit, switching means between said condenser and starting winding for disconnecting the condenser after the motor has started, and a relay for operating said switch having a winding connected across the starting winding and switch.

10. A single phase motor comprising main and starting windings connected in parallel circuits to energizing terminals, a pair of condensers connected in parallel in the starting winding circuit, a switch between one of said condensers and starting winding for disconnecting only one of said condensers after the motor has started, and relay means having a coil connected across said starting winding and switch for operating said switch.

11. A single phase motor having main and starting windings connected in parallel circuits to energizing terminals, phase modifying means connected in series relation in the starting winding circuit, a switch between said phase modifying means and starting winding for disconnecting the phase modifying means after the motor has been started, voltage varying means for varying the speed of the motor, a second switching means having a line terminal for connecting the common point of said motor windings directly to said line terminal for starting the motor, and in series with the voltage varying means to said line terminal after the motor has been started, and relay means energized from said line terminal and a point between the first mentioned switch and phase modifying means for operating said switching means.

ALAN F. LUKENS.